(12) United States Patent
Zhu et al.

(10) Patent No.: US 11,186,883 B2
(45) Date of Patent: Nov. 30, 2021

(54) CURABLE PROTECTIVE COATING COMPOSITION

(71) Applicant: Henkel AG & Co. KGaA, Duesseldorf (DE)

(72) Inventors: Yakun Zhu, Shanghai (CN); Xueting Qiu, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/458,244

(22) Filed: Jul. 1, 2019

(65) Prior Publication Data

US 2019/0376155 A1 Dec. 12, 2019

Related U.S. Application Data

(63) Continuation of application No. PCT/CN2017/070611, filed on Jan. 9, 2017.

(51) Int. Cl.
| | | |
|---|---|---|
| *C21D 1/70* | (2006.01) | |
| *B21D 22/02* | (2006.01) | |
| *C09D 1/00* | (2006.01) | |
| *C09D 1/02* | (2006.01) | |
| *C09D 183/04* | (2006.01) | |
| *C21D 8/02* | (2006.01) | |

(52) U.S. Cl.
CPC ............. *C21D 1/70* (2013.01); *B21D 22/022* (2013.01); *C09D 1/00* (2013.01); *C09D 1/02* (2013.01); *C09D 183/04* (2013.01); *C21D 8/0205* (2013.01); *C21D 8/0284* (2013.01)

(58) Field of Classification Search
CPC .......... B21D 22/022; C09D 1/00; C09D 1/02; C09D 183/04; C21D 1/70; C21D 8/0205; C21D 8/0284
See application file for complete search history.

(56) References Cited

U.S. PATENT DOCUMENTS

| | | | |
|---|---|---|---|
| 5,344,509 A | 9/1994 | Zylla | |
| 2007/0238257 A1* | 10/2007 | Paar | C09D 183/04 |
| | | | 438/305 |
| 2008/0233295 A1* | 9/2008 | Ye | C23D 5/02 |
| | | | 427/372.2 |
| 2010/0098956 A1* | 4/2010 | Sepeur | C23C 18/122 |
| | | | 428/457 |
| 2010/0175794 A1 | 7/2010 | Sepeuretal | |
| 2015/0275044 A1 | 10/2015 | Roth et al. | |
| 2016/0083306 A1* | 3/2016 | Connors, Jr. | C09D 133/08 |
| | | | 523/122 |
| 2016/0083814 A1* | 3/2016 | Hsieh | C09D 1/00 |
| | | | 428/562 |
| 2017/0016086 A1* | 1/2017 | Sandres | C09D 133/02 |
| 2017/0266761 A1* | 9/2017 | Schmit | B23K 26/348 |
| 2017/0268078 A1* | 9/2017 | Sanadres | C21D 1/22 |
| 2019/0249271 A1* | 8/2019 | Chiriac | C21D 1/42 |

FOREIGN PATENT DOCUMENTS

| | | | |
|---|---|---|---|
| CN | 1510089 A | | 7/2004 |
| CN | 1632137 A | | 6/2005 |
| CN | 100453604 C | * | 1/2009 |
| CN | 101693791 A | | 4/2010 |
| CN | 101705024 A | | 5/2010 |
| CN | 102585568 A | | 7/2012 |
| CN | 102762750 A | | 10/2012 |
| CN | 103014270 A | | 4/2013 |
| CN | 104789068 A | * | 7/2015 |
| CN | 105731847 A | * | 7/2016 |
| CN | 105969959 A | | 9/2016 |
| CN | 106280984 A | * | 1/2017 |
| CN | 106280985 A | * | 1/2017 |
| CN | 108034336 A | * | 5/2018 |
| JP | S60251218 A | | 12/1985 |
| JP | H1222564 A | | 8/1999 |
| JP | 2009262402 A | | 11/2009 |
| JP | 2012255085 A | * | 12/2012 |
| KR | 101151909 B1 | * | 5/2012 |
| KR | 101153782 B1 | * | 6/2012 |
| WO | 2008095329 A1 | | 8/2008 |
| WO | WO-2015181581 A1 | * | 12/2015 ............. C22C 21/10 |

OTHER PUBLICATIONS

Machine Translation of Chinese Patent Specification No. CN 102585568 A (Year: 2012).*
International Search Report for PCT/CN2017/070611, dated Sep. 29, 2017.
S. Brunauer, et al, "Adsorption of Gases in Multimolecular Layers", J. Am. Chemical Society, vol. 60 (1938), pp. 309-319.
Zhu, JX et al, "Antioxidation coating of stainless steel at high temperature", Materials Protection, vol. 33 (2000), pp. 38-48. Cited in co-pending related Chinese application as Zhu, JX et al, "Antioxidation coating of stainless steel at high temperature", Rare Metal Materials and Engineering, vol. 31 (2002), pp. 543-846.
Chang, Ying et al., "Effect of oxidation behavior on heat transfer dynamics performance of hot stamping steel", Journal of Jilin University (Engineering and Technology Edition), vol. 43, No. 6 (2013), pp. 1551-1557. Cited in co-pending related Chinese application.
Supplementary European Search Report for EP 17890556 dated May 20, 2020.

* cited by examiner

*Primary Examiner* — Anthony J Green
(74) *Attorney, Agent, or Firm* — Mary K. Cameron

(57) ABSTRACT

The present invention relates to a self-collapsed protective coating composition and use thereof. In particular, the invention relates to a self-collapsed protective coating composition for hot stamping of steel material, which can protect the surface of steel material from oxide scale and provide ease for subsequent welding.

23 Claims, 5 Drawing Sheets

*FIG. 2C* *FIG. 2D*
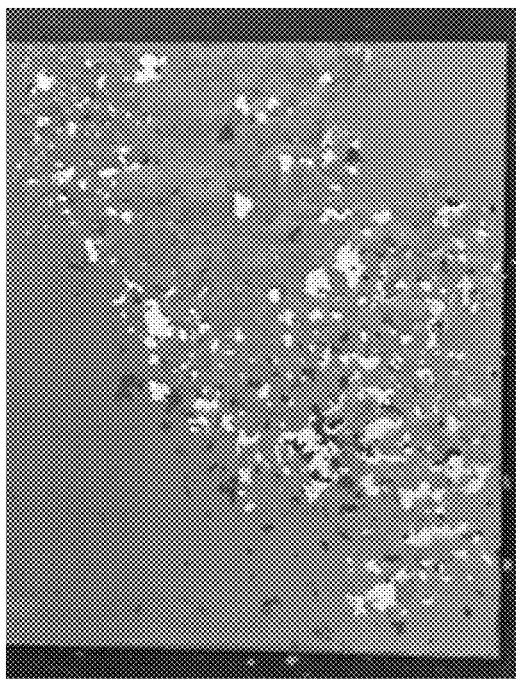 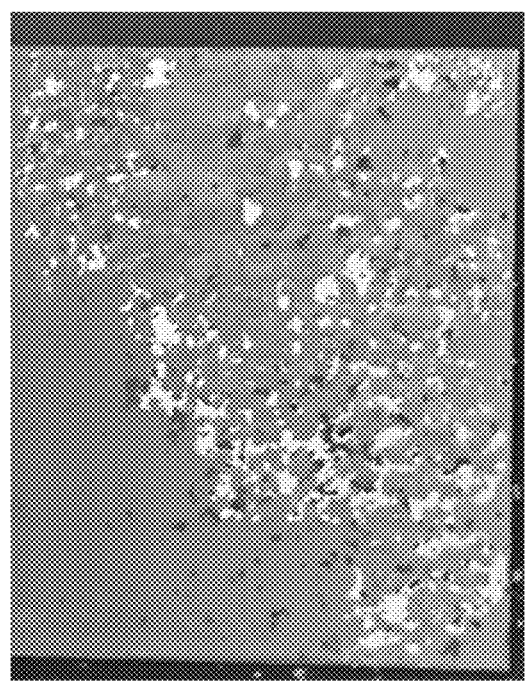

CURABLE PROTECTIVE COATING COMPOSITION

TECHNICAL FIELD

The present invention relates to a curable protective coating composition and use thereof. In particular, the invention relates to a curable protective coating composition for hot stamping of steel material, which can protect the surface of steel material from oxide scale and provide ease for subsequent welding.

BACKGROUND OF THE INVENTION

Due to the demand for reduced vehicle weight and improved safety, the need to manufacture automobile structural parts from high strength steels (HSS) is desired. HSS components with desired properties are usually produced by hot stamping (also called press hardening) process. In the hot stamping process, the bare steel surface is oxidized and decarburized, which have a negative influence on both the surface appearance and the mechanical properties of hot stamped parts. The hard and brittle iron oxide particles also plough on the tool surface leading mainly to abrasive wear. The oxide layer must be removed by shot peening to avoid a bad paint adherence. In order to avoid these, most sheet metal blanks are pre-coated with a protective layer, such as Al/Si, Al, Zn, Zn/Ni, etc.

However, hot-dip aluminized sheet only suits for direct process, and hot-dip galvanized sheet only suit for indirect process. Moreover, these Zn and Al/Si-coated blanks tend to cause mainly adhesive wear on the roller and tool surface. Oxides formed on coating surfaces counteract the wettability of welding filler during a welding or brazing process which will be applied to the steel parts after the hot stamping process. Aluminum and silicon in the Al—Si coating were primarily dissolved into weldments as solid solution and partially developed as an inter-metallic phase with Fe. The inter-metallic phase precipitated along the fusion line, which weakened the strength of the weldments.

Thus, there is still a need for a curable protective coating composition which can at least partially solve the above mentioned problem. In particular, the present invention provides a curable protective coating composition which can be easily applied on steel material, can protect the steel surface from corrosion during hot stamping process, can be self-removable from the surface after cooling and offers a fresh surface of steel so as to improve the welding property of steel parts.

SUMMARY OF THE INVENTION

The present invention provides a curable protective coating composition, comprising a film forming binder, a pigment, a stripping agent, and a solvent.

The present invention also provides a hot stamping process for steel material, comprising:
a) applying the curable protective coating composition according to the present invention onto the surface of the steel material,
b) curing the curable protective coating composition to obtain a protective coating onto the surface of the steel material,
c) hot stamping the coated steel material,
d) cooling the coated steel material to allow the protective coating to self-collapse, and
e) removing the collapsed coating from the surface of the steel material.

BRIEF DESCRIPTION OF THE DRAWINGS

FIGS. 2A-2E show the self-collapsing of the protective coating in Example 1 after cooling in room temperature for: 110 seconds FIG. 2A; 115 seconds FIG. 2B; 120 seconds FIG. 2C; 130 seconds FIG. 2D; and 150 seconds FIG. 2E.

DETAILED DESCRIPTION OF THE INVENTION

Figure 1:
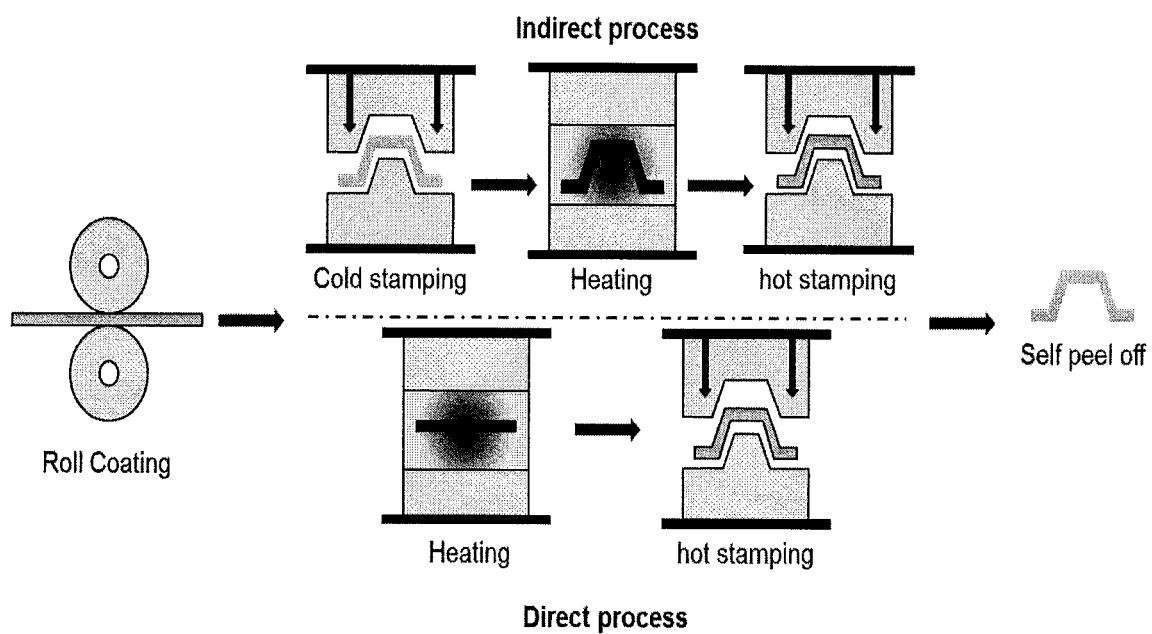
FIG. 1 illustrates a flow chart of the hot-stamping process according to the present invention.
Figure 2A:
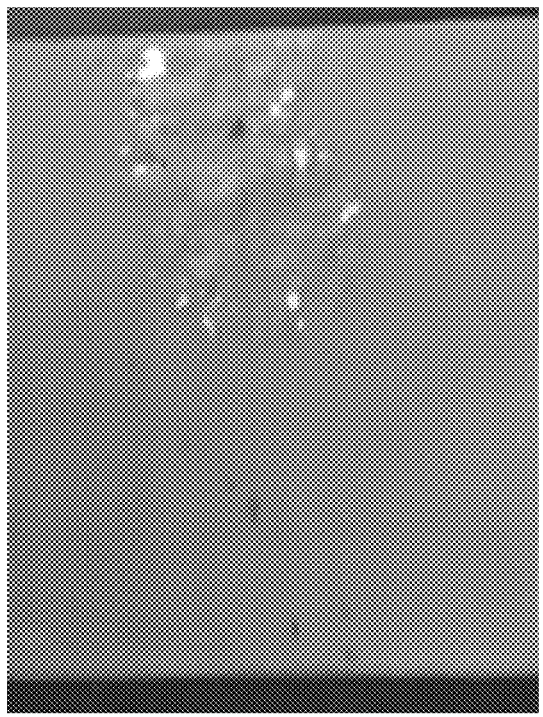
Figure 2B:
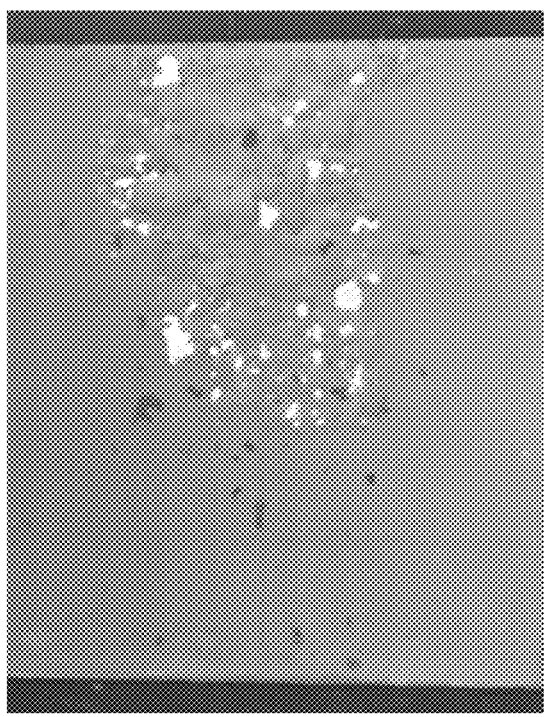
Figure 2E:
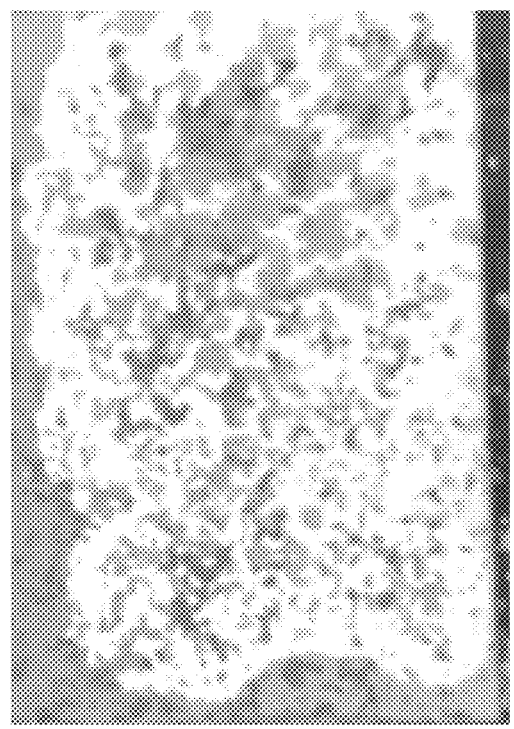

In the following passages the present invention is described in more detail. Each aspect so described may be combined with any other aspect or aspects unless clearly indicated to the contrary. In particular, any feature indicated as being preferred or advantageous may be combined with any other feature or features indicated as being preferred or advantageous.

In the context of the present invention, the terms used are to be construed in accordance with the following definitions, unless a context dictates otherwise.

As used herein, the singular forms "a", "an" and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or process steps.

The recitation of numerical end points includes all numbers and fractions subsumed within the respective ranges, as well as the recited end points.

All references cited in the present specification are hereby incorporated by reference in their entirety.

Unless otherwise defined, all terms used in the disclosing the invention, including technical and scientific terms, have the meaning as commonly understood by one of the ordinary skill in the art to which this invention belongs to. By means of further guidance, term definitions are included to better appreciate the teaching of the present invention.

In one aspect, the present invention provides a curable protective coating composition, comprising a film forming binder, a pigment, a stripping agent, and a solvent.

The inventors have surprisingly found that the protective coating produced by the curable protective coating composition according to the present invention by curing under elevated temperature can effectively prevent from oxide scale during hot-stamping and self-collapse after cooling. Therefore, the protective coating can be easily removable from the steel material after a hot-stamping process without shot blasting process, and result in a fresh steel surface which is conveniently treated by subsequent resistance spot welding process without the negative influence from the contamination on the surface to be welded, compared to the prior art.

As used herein, the term "metallic surface" refers to surfaces of metallic substrate such as steel substrate from which oils and rust film have been removed. This type of surface may be provided using wet chemical methods, for example by means of alkaline pickling solutions, which are known to those skilled in the art in the field of metal surface treatment.

The film forming binder used in the curable protective coating composition according to the present invention is selected from the group consisting of organosilicon polymer, organotitanium polymer, silicate, silane monomer, silane oligomer, silica, titanium oxide sol and combination thereof. Such binders typically begin to pyrolyze at temperatures above 300° C., forming a silicate and/or titanate matrix which encloses all other solid components. Accordingly, this silicate/titanate matrix forms in the furnace during heating of the steel substrate according to the present invention, directly prior to the forming. During the forming process, under the high pressure of the pressing and forming tools, layers of a ceramic coating form which resemble the sintered layers of silicates/titanates, and which therefore have correspondingly high mechanical and thermal stability. At the same time, other solid components such as the pigment and stripping agent of the pyrolyzed protective coating go into the molten state at the hot forming temperature. Thus, in the hot stamping process of the steel substrate according to the invention, a conversion of the cured protective coating into a ceramic silicate/titanate coating distributed with pigment and stripping agent takes place.

Organosilicon polymer are particularly suitable binders used in the curable protective coating composition according to the present invention. Organosilicon polymers, such as silicone resins are made up of siloxane units, and are obtained by condensation of differently aliphatically substituted silanes, the structure and degree of crosslinking of the silicone resin being determined essentially by the type and the relative quantity ratio of these silanes. The silicone resins are therefore characterized by the ratio of the different siloxane structural units in the polymeric network. One Si—O linkage is present in monofunctional (M) siloxane units, two Si—O linkages are present in difunctional (D) siloxane units, three Si—O linkages are present in trifunctional (T) siloxane units, and four Si—O linkages are present in tetrafunctional (Q) siloxane units. In the curable protective coating composition, a highly crosslinked silicone resins with less organic groups are preferred which are made up of T- and D-functional siloxane units, the molar ratio of T-functional to D-functional siloxane units preferably being between 20:1 and 5:1, particularly preferably between 15:1 and 10:1.

Organotitanium polymer is also a useful film forming binder in the present invention. The organotitanium polymer is also referred as polytitanoxane which is an organic-inorganic hybrid compound comprising a Ti—O—Ti repeating structure and an R—O—Ti linkage, wherein R represents an organic group.

Silane monomers/oligomers suitable to be used as the film forming binder in the present invention can be selected from the group consisting of tetraalkoxysilane, alkyltrialkoxysilane, tetraalkoxysilane, aryltrialkoxysilane, dialkyldialkoxysilane, diaryldialkoxysilane, arylalkyldialkoxysilane, aminosilane, thiol silane, an oligomer and a mixture thereof.

Silica is also a useful film forming binder in the present invention. The silica is in the form of particles, and may be selected from fumed silica particles, colloidal silica particles, and the combination thereof.

Fumed silica particles, which are also referred to as pyrogenic silica particles, are produced by pyrogenic processes and have the chemical composition $SiO_2$. Fumed silica particles, typically, are aggregate particles of smaller primary particles, which are held together by relatively strong cohesive forces, such that the aggregate particles are not broken down into primary particles when dispersed in a liquid (e.g., aqueous) medium. Aggregate fumed silica particles may also form larger agglomerate particles, which are held together by relatively weak cohesive forces. Agglomerate particles usually are broken down into aggregate particles when dispersed in a liquid (e.g., aqueous) medium.

The surface area of most metal oxide particles can be determined by the method of S. Brunauer, P. H. Emmet, and I. Teller, J. Am. Chemical Society, 60, 309 (1938), which is commonly referred to as the BET method. As noted above, fumed silica particles suitable for use in the invention have a BET surface area of about 70 to about 140 $m^2/g$ (e.g., about 80 to about 130 $m^2/g$). In one preferred embodiment, the fumed silica particles have a BET surface area of about 80 to about 100 $m^2/g$ (e.g., about 90 $m^2/g$).

Colloidal silica particles are generally produced by "wet chemistry" processes and also have the chemical composition $SiO_2$. Typically, colloidal silica is produced by the addition of an acid to an alkaline metal silicate solution (e.g., sodium silicate solution), thereby causing the silicate to polymerize and form discrete particles of amorphous silica. Colloidal silica particles, typically, are discrete, substantially spherical silica particles having no internal surface area. Colloidal silica particles suitable for use in the present invention have a BET surface area of 110 to about 150 $m^2/g$. In a preferred embodiment, the colloidal silica particles have a BET surface area of about 120 to about 140 $m^2/g$ (e.g., about 130 $m^2/g$).

In the curable protective coating composition, the film forming binder is preferably present in an amount of 10% to 50% by weight, more preferably 15% to 35% by weight, based on the total weight of all components of the composition.

The pigment suitable to be used in the present invention is an inorganic pigment, and more preferably a metal pigment. Such pigment can be selected from the group consisting of bauxite, Feldspar, kaolin, calcium carbonate, titanium dioxide, mica, quartz and combination thereof. Preferably, the metal pigment essentially consists of or consists of a metal selected from the group consisting of Al, Zn, Cu, Fe, Cr, Sn, Co, Mo, Mn, Ni, Ti, and Bi. As used herein, the term "essentially consists of" refers to that the concentration of metal in the metal particulate pigment is larger than 70% by mass, preferably larger than 80% by mass, more preferably larger than 90% by mass, in particular larger than 95% by mass. In one embodiment, the metal particulate pigment consists of Al.

In addition, it will be advantageous that the metal particulate pigment in the protective coating composition according to the invention are present in the form of flakes or spherical particles. Flakes are preferred when the metal particulate pigment since during application of a wet film of the coating, such flakes tend to align over the steel surface in an overlapping, scale-like manner, so that the anti-scaling protection during the hot stamping process may be further optimized in this way. For this purpose, such metal flakes are preferably used in the coating composition of the present invention which are commercially available as a powder or paste, and which in this usage form have a ratio of thickness to diameter in the range of 1:50 to 1:500, the D50 value preferably being in the range of 2 to 10 μm. Regardless of the flake dimensions, the D50 value is determined from cumulative particle size distributions ascertained from dynamic light scattering measurements, the D50 value indicating that 50% by volume of the pigment particles have an experimentally determined particle size below the stated value.

In the curable protective coating composition, the pigment is preferably present in an amount of 5% to 40% by weight, more preferably 10% to 30% by weight based on the total weight of all components of the composition.

According to the present invention, the stripping agent compatible with other components in the curable protective coating composition, contributes to the effect that the coating on the substrate can quickly self-collapse and be peeled off when the coating is cooled after heating under hot-stamping temperature.

The stripping agent suitable to be used in the present invention may be selected from the group consisting of graphite, metallic oxide, non-metallic oxide, and combination thereof.

Suitable examples of stripping agent are those having a softening/melting point of 300° C. to 750° C., or those can occur oxidation or reduction reaction under the temperature of 300° C. to 750° C. Preferably, the stripping agent is in the form of particles. The particle size of such stripping agent is not limited, but preferably has a D90 value of less than 50 µm, preferably less than 30 µm, and more preferably less than 10 µm. The stripping agent may be modified by ball milling or other conventional grounding methods before the preparation of the coating composition so that the above desired properties of the stripping agent are achieved.

The graphite suitable to be used as the stripping agent in the coating composition has a carbon content of at least 99%. In particular, the graphite is in the form of particles, and the particles have a D90 particle size of less than 50 microns, preferably less than 10 microns.

There is no limitation to the selection of metallic/non-metallic oxide as long as it is compatible with other components in the curable protective coating composition. Examples of metallic oxide which is useful in the present invention are $ZnO$, $Bi_2O_3$, $Al_2O_3$, $BaO$, $CaO$, $MgO$, $MnO_2$, $ZrO_2$, $TiO_2$, $CeO_2$, $SrO$, $V_2O_5$, $SnO_2$, $Li_2O$, $Na_2O$, $K_2O$, $PbO$, $CdO$, $ZnO$, $FeO$, $Fe_2O_3$, $Fe_3O_4$, $CuO$ and combination thereof. Examples of non-metallic oxide which is useful in the present invention are $SiO_2$, $B_2O_3$, $P_2O_5$ and combination thereof. In one embodiment, the stripping agent is an oxide mixture consisting of metallic and non-metallic oxides selected from the group consisting of $Al_2O_3$, $SiO_2$, $Fe_2O_3$, $CaO$, $MgO$ and combination thereof. In another embodiment, the stripping agent is an oxide mixture comprising or consisting of 80.0% to 99.9%, preferably 99% to 99.9% of $Al_2O_3$, 0.01% to 20%, preferably 0.05 to 0.2% of $SiO_2$, 0.001% to 0.5%, preferably 0.005% to 0.2% of $Fe_2O_3$, 0.01% to 1%, preferably 0.02% to 0.5% of $CaO$, and 0.01% to 1%, preferably 0.02% to 0.5% of $MgO$, in which the percentages are based on the weight of the oxide mixture.

In the curable protective coating composition, the stripping agent is preferably present in an amount of 0.5% to 15% by weight, more preferably 2% to 10% by weight based on the total weight of all components of the composition.

Solvents suitable in this context are preferably selected from the group consisting of water, alcohols, esters, ethers, hydrocarbons, and mixture thereof, with preference being given to the use of solvents having a flash point >23° C. Examples of suitable solvents include acetone, ethyl acetate, glycol ether, dimethylformamide, dimethyl acetamide, dimethylsulfoxide, acetonitrile, xylene, toluene, a halogenated hydrocarbon such as methylenedichloride, ethylenedichloride or chloroform, an alcohol such as methanol, ethanol, n-propanol, isopropanol, n-butanol, isobutanol, tert-butanol, n-amyl alcohol, iso-amyl alcohol, tert-amyl alcohol, and mixture thereof. Since it is advantageous when the solvent of the paint evaporates slowly during drying and curing of the coating, organic solvents having boiling points above 100° C. are preferred.

In addition, the coating composition is preferably to be applied for which the weight ratio of the pigment to the film forming binder is from 0.3 to 2.5, preferably from 0.3 to 2.0, in order to be able to sufficiently incorporate the particulate pigments into the film forming binder, and thus to achieve homogeneous coatings. The particulate solid fractions of the curable protective coating composition have a D90 value of less than 50 µm, preferably less than 30 µm, and more preferably less than 10 µm.

In another aspect, the present invention also concerns a hot stamping process for steel material, comprising:
  a) applying the curable protective coating composition according to the present invention onto the surface of the steel material,
  b) curing the curable protective coating composition to obtain a protective coating onto the surface of the steel material,
  c) hot stamping the coated steel material,
  d) cooling the coated steel material to allow the protective coating to self-collapse, and
  e) removing the collapsed coating from the surface of the steel material.

The application of the curable protective coating composition may take place by using the application methods known in the prior art such as bar coating, air-knife coating, roll coating, spray coating and dip coating. In the cases in which flat substrates are to be coated, the application preferably takes place in the roller application method. If a substrate in a coil shape, for example a steel coil is to be coated, a pretreatment for Si-based passivation on the steel coil may be applied prior to the application of the coating composition on the substrate. The curable protective coating composition can be applied by roller application onto the steel surface after the steel is manufactured in a steel manufacturing site, or can be applied by spraying or other process onto the steel surface in a hot-stamping site. And the cured coating can also provide corrosion protection to the steel during the storage and transfer between the two sites.

The coating composition can be cured by flashing off at room temperature or by accelerated curing at an elevated temperature, in which case temperatures of preferably up to 300° C. may be employed for the drying and curing of the coating. Preferably, the curable protective coating composition is cured under a temperature 100° C. to 300° C. Accelerated curing by means for example of IR radiation, forced-air drying, UV irradiation or electron beam curing may also be useful. The coating can be applied not only to flat substrates but also to coils which are passing through a cold and/or hot forming step, or else the coating can be applied to substrates which have already undergone cold forming.

The coating composition according to the present invention may be applied in so called "direct" or "indirect" hot forming/stamping process. As shown in FIG. 1, in an indirect process of hot stamping, a flat substrate coated with the protective coating composition is sequentially pre-stamped, heated and then hot stamped. In a direct process, the coated flat substrate is first heated and then hot stamped.

The present coating composition is suitable particularly for the surface coating of a substrate whose surface is composed at least partly of steel. The coating composition is intended in particular for the surface coating of substrates made of high-strength steel, and is suitable preferentially for the surface coating of a high-strength steel substrate which, following the surface coating, is subjected to a hot forming operation or hot stamping process, in particular to hot forming at temperatures between 800° C. and about 1000° C., preferably at between about 880° C. and about 970° C. These types of steels are, for example, duplex steels alloyed with chromium, nickel, and manganese, and boron-manganese-steels.

In addition it is possible where appropriate to add commercially customary wetting/dispersion agent, thickener, setting agent, rheological agent, leveling agent, defoamer, hardness improving agent, lubricant and coating film modifier or the like. Suitable examples of coating film modifier are cellulosic materials, such as cellulose esters and cellulose ethers; homopolymers or copolymers from styrene, vinylidene chloride, vinyl chloride, alkyl acrylate, alkyl methacrylate, acrylamide, methacrylamide, acrylonitrile, methacrylonitrile, vinyl ether, and vinyl acetate monomers; polyesters or copolyesters; polyurethanes or polyurethane acrylates; epoxy resins; polyvinylpyrrolidone; polytetrafluoroethylene, polyphenyl, polyphenylene, polyimide and polytetrafluoroethylene.

In one particular embodiment, (meth)acrylate resin is further comprised in the water-borne coating composition according to the present invention.

According to the present invention, for setting a coating layer thickness which results in sufficient anti-scale self-collapsed protection during hot forming, it should preferably be ensured during application of the coating that the applied wet film of the coating composition has a solids fraction of at least 3 g, preferably at least 6 g, based on the square meters of the substrate surface wetted with the wet coating film. However, preferably no such wet films should be applied for which the solids fraction is above 30 g, based on the square meters of the substrate surface wetted with the wet coating film, since it is costly and the coating will self-collapse and be removed from the substrate in the end of the process according to the present invention. The protective coating layer according to the hot stamping process has a dry film thickness of 2 to 20 µm, preferably 5 to 15 µm, and more preferably 8 to 12 µm.

In one preferred method according to the present invention, the curing of the coating composition which is applied as a wet coating film to the substrate surface provided with the thin silicate layer is carried out at a maximum metal substrate temperature (PMT) in the range of 100° C. to 300° C.

The present invention relates to the production of a special protective layer which is applied in the form of a coating material to the steel and is subsequently dried or heat-cured at 100° C. to 300° C., and which effectively protects the coated parts against scaling in the hot forming operation at, for example, 950° C.

A coating composition is obtained which can be applied in particular by wet-chemical means to a metallic surface and by means of which the metallic surface, especially a steel surface, can be protected effectively against scaling on contact with atmospheric oxygen, at temperatures of the kind which occur in the course of hot forming. Surprisingly it has emerged that, through the incorporation of a stripping agent, the coating composition can self-collapse and is easily removable so as to create a fresh surface of hot-formed substrate and thus increases the weldability of the substrate.

EXAMPLES

The following examples are intended to assist one skilled in the art to better understand and practice the present invention. The scope of the invention is not limited by the examples but is defined in the appended claims. All parts and percentages are based on weight unless otherwise stated.

Materials

Organosilicon polymer: the molar ratio of T-functional to D-functional siloxane units=12.3, commercially available by trade name of Dow Corning® from Dow Corning.

Aluminum flakes: D50<10 µm, commercially available by trade name of Benda-Lutz® from DIC.

(Meth)acrylate resin, commercially available by trade name NeoCryl® from DSM.

$Al_2O_3$, $SiO_2$, $Fe_2O_3$, CaO, MgO: commercially available by trade name of Hushi® from Sinopharm Chemical Reagent Co., Ltd.

Kaolin powder: commercially available by trade name of Hengda® from Suzhou Hengda Kaolin company.

Graphite: D90<10 µm, commercially available by trade name of Tianheda® from Qingdao Tianheda Graphite Co., Ltd.

Preparation

The oxide mixture 1 used in the examples was prepared by mixing and melting 99.7 g $Al_2O_3$, 0.15 g $SiO_2$, 0.01 g $Fe_2O_3$, 0.08 g CaO and 0.06 g MgO in a melting furnace, and then grinding the mixture to achieve a D90 value of less than 5 µm by ball mill.

The oxide mixture 2 used in the examples was prepared by mixing and melting 99.7 g $Al_2O_3$, 0.15 g $SiO_2$, and 0.01 g $Fe_2O_3$, in a melting furnace, and then grinding the mixture to achieve a D90 value of less than 5 µm by ball mill.

The curable protective coating compositions having the formulations shown in Table 1 according to the present invention were prepared as Examples 1 to 5 by dispersing the pigment and the stripping agent in a mixer to obtain a paste, and then mixing the paste into the binder and solvent until a homogenous coating composition was obtained.

The comparative example was also prepared in the same way as Examples 1 to 5 except that the stripping agent was not added.

A substrate made of boron-manganese-steel was cleaned, rinsed by deionized water and dried. Each coating composition was applied onto clean substrates by a drawdown bar with a coating thickness of 8 µm. The coated substrate was moved to an oven and baked at 240° C. for 30 s to harden the coating and then treated at 950° C. for 2 min in Muffle furnace for hot-stamping.

The following tests were used to determine the performance of the protective coating.

Self-Collapsing Test:

The hot-stamped panels having cured coating were further cooled under room temperature for 5 minutes, and the self-collapsing percent area on each panel was recorded in Table 1.

Resistance Spot Welding (RSW) Test

The RSW performance was tested by a TCW-33E III welding controller. The following parameters were set for the RSW test of the coating: Current: 4 to 5 KA, Force: about 4000N, Total time: 0.52 s. After welding, the splatters and residuals around the welding spot on the panel substrate were observed, and the results were shown in Table 1.

TABLE 1

Formulations of curable protective coating compositions (parts by weight) and testing results

| | Example 1 | Example 2 | Example 3 | Example 4 | Example 5 | Comparative Example |
|---|---|---|---|---|---|---|
| Composition | | | | | | |
| Organosilicon polymer | 26.65 | 10.0 | 30.42 | 13.0 | 30.42 | 26.65 |
| Kaolin powder | — | 15.05 | — | 13.35 | — | — |
| Oxide mixture 1 | 3.0 | — | 6.0 | 8.0 | 5.0 | — |
| Oxide mixture 2 | — | 5.3 | — | — | — | — |
| Graphite | — | 3.0 | — | — | — | — |
| Aluminum flake | 14.13 | 15.0 | 18.70 | 15.0 | 19.70 | 17.13 |
| (Meth)acrylate resin | — | 6.55 | — | 5.55 | — | — |
| Xylol | 11.11 | — | 10.97 | — | 10.97 | 11.11 |
| n-Butanol | 45.11 | — | 33.91 | — | 33.91 | 45.11 |
| Deionized water | — | 45.1 | — | 45.1 | — | — |
| Test results | | | | | | |
| Self-collapsing area | 100% | 90% | 98% | 95% | 95% | 0% |
| Splatters and residuals after welding | No | No | No | No | No | Significant |
| Electrode Life time (times of welding) | >50 | >50 | >50 | >50 | >50 | 1 |

Figure 3A:
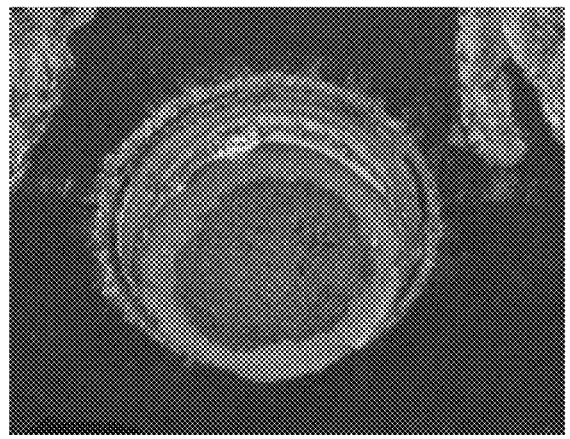
FIG. 3A shows the welding performance obtained by Example 1 (a) and FIG. 3B shows the welding performance of Comparative Example (a).
Figure 3B:
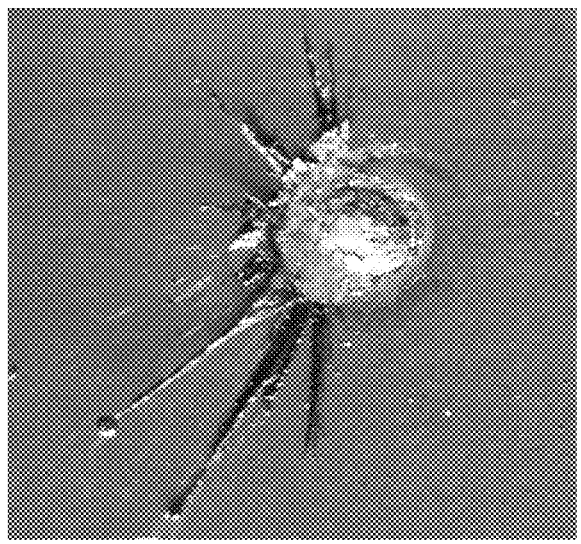

As it is clearly in the test results of Table 1, compared to the comparative example containing no stripping agent, all inventive examples surprisingly exhibited an excellent quick self-collapsing from the steel substrate after cooling, and thus provided a surface having excellent condition for electronic spot welding without any splatter and any residual on the substrate and achieving a long life time for the electrode which could be continuously welded at least 50 times without cleaning and dressing. For example, the cured protective coating of Example 1 was self-collapsed and could be easily peeled off from the substrate in 3 minutes as shown in FIGS. 2A to 2E. In addition, after welding, no splatter and residual could be observed on the substrate treated with the protective coating of Example 1 as shown in FIG. 3A, but significant residuals were observed on the substrate treated with the protective coating of Comparative Example, as shown in FIG. 3B.

What is claimed is:

1. A curable protective coating composition, comprising a film forming binder, a pigment, a stripping agent different from the pigment, and a solvent, wherein the film forming binder comprises an organosilicon polymer, the film forming binder optionally further comprising organotitanium polymer, titanium oxide sol and combinations thereof, wherein the organosilicon polymer comprises T-functional and D-functional siloxane units with the molar ratio of the T-functional to the D-functional siloxane units being from 20:1 to 5:1.

2. The curable protective coating composition according to claim 1, wherein the pigment is an inorganic pigment selected from the group consisting of bauxite, feldspar, kaolin, calcium carbonate, titanium dioxide, mica, quartz and combinations thereof.

3. The curable protective coating composition according to claim 1, wherein the pigment is a metal pigment consisting essentially of a metal selected from the group consisting of Al, Zn, Cu, Fe, Cr, Sn, Co, Mo, Mn, Ni, Ti, and Bi.

4. The curable protective coating composition according to claim 1, wherein the pigment is present in an amount of 5% to 40% by weight, based on the total weight of all components of the composition.

5. The curable protective coating composition according to claim 1, wherein the stripping agent is selected from the group consisting of graphite, metallic oxide, non-metallic oxide, and combinations thereof.

6. The curable protective coating composition according to claim 1, wherein the stripping agent is present in an amount of 0.5% to 15% by weight, based on the total weight of all components of the composition.

7. The curable protective coating composition according to claim 1, wherein the solvent is selected from water, an alcohol, ester, ether, a hydrocarbon, and mixtures thereof.

8. The curable protective coating composition according to claim 7, wherein the hydrocarbon is present in the solvent and is a halogenated hydrocarbon selected from methylenedichloride, ethylenedichloride and chloroform, and mixtures thereof.

9. The curable protective coating composition according to claim 1, wherein the solvent is selected from acetone, ethyl acetate, glycol ether, dimethylformamide, dimethyl acetamide, dimethylsulfoxide, acetonitrile, xylene, toluene and mixtures thereof.

10. The curable protective coating composition according to claim 1, wherein the solvent is present in an amount of 10% to 70% by weight, based on the total weight of all components of the composition.

11. The curable protective coating composition according to claim 1, wherein the weight ratio of the pigment to the film forming binder is from 0.3 to 2.5.

12. A curable protective coating composition, comprising a film forming binder, a pigment, a stripping agent different from the pigment, and a solvent, wherein the film forming binder is selected from the group consisting of organosilicon polymer, organotitanium polymer, titanium oxide sol and combinations thereof, wherein the organosilicon polymer comprises T-functional and D-functional siloxane units with the molar ratio of the T-functional to the D-functional siloxane units being from 20:1 to 5:1, wherein the film forming binder is present in an amount of 10% to 40% by weight, based on the total weight of all components of the composition, the pigment comprises a metal pigment and an inorganic pigment comprising kaolin; wherein the coating composition is water-borne, the solvent comprising water, and further comprises (meth)acrylate resin.

13. A curable protective coating composition, comprising a film forming binder, a pigment, a stripping agent, and a solvent, wherein the stripping agent is an oxide mixture comprising 80.0% to 99.9% of $Al_2O_3$, 0.01% to 20% of $SiO_2$, 0.001% to 0.5% of $Fe_2O_3$, 0.01% to 1% of CaO, and 0.01% to 1% of MgO, in which the percentages are based on the weight of the oxide mixture.

14. A curable protective coating composition, comprising a film forming binder, a pigment, a stripping agent different from the pigment, and a solvent, wherein the film forming binder is selected from the group consisting of organosilicon polymer, organotitanium polymer, titanium oxide sol and combinations thereof, wherein the organosilicon polymer comprises T-functional and D-functional siloxane units with the molar ratio of the T-functional to the D-functional siloxane units being from 20:1 to 5:1, and wherein the stripping agent has a D90 value of less than 50 μm.

15. A curable protective coating composition, comprising a film forming binder, a pigment, a stripping agent different from the pigment, and a solvent; wherein the film forming binder is selected from the group consisting of organosilicon polymer, organotitanium polymer, titanium oxide sol and combinations thereof, the organosilicon polymer comprises T-functional and D-functional siloxane units with the molar ratio of the T-functional to the D-functional siloxane units being from 20:1 to 5:1, wherein the solvent comprises an alcohol selected from methanol, ethanol, n-propanol, iso-propanol, n-butanol, isobutanol, tert-butanol, n-amyl alcohol, iso-amyl alcohol, tert-amyl alcohol, and mixtures thereof; and optionally one or more of water, ester, ether, and a hydrocarbon.

16. A curable protective coating composition, comprising a film forming binder, a pigment, a stripping agent different from the pigment, and a solvent, wherein the film forming binder is selected from the group consisting of organosilicon polymer, organotitanium polymer, titanium oxide sol and combinations thereof, wherein the organosilicon polymer comprises T-functional and D-functional siloxane units with the molar ratio of the T-functional to the D-functional siloxane units being from 20:1 to 5:1, wherein particulate solid fractions of the curable protective coating composition have a D90 value of less than 50 μm.

17. A curable protective coating composition, comprising a film forming binder, a pigment, a stripping agent different from the pigment, and a solvent, wherein the film forming binder comprising organosilicon polymer, organotitanium polymer, and/or titanium oxide sol, the organosilicon polymer comprises T-functional and D-functional siloxane units with the molar ratio of the T-functional to the D-functional siloxane units being from 20:1 to 5:1 and the pigment includes an inorganic pigment selected from the group consisting of bauxite, feldspar, kaolin, calcium carbonate, titanium dioxide, mica, quartz and combinations thereof; and a metal pigment consisting essentially of a metal selected from the group consisting of Al, Zn, Cu, Fe, Cr, Sn, Co, Mo, Mn, Ni, Ti, and Bi.

18. A curable protective coating composition, comprising:
   10% to 50% by weight of a film forming binder, the film forming binder being selected from group consisting of organosilicon polymer, organotitanium polymer, silicate, silane monomer, silane oligomer, silica, titanium oxide sol and combinations thereof, wherein the silica of the film forming binder is fumed silica and/or colloidal silica, having a BET surface area of 70-150 $m^2/g$;
   10% to 30% by weight of a pigment, the pigment being selected from the group consisting of bauxite, Feldspar, kaolin, calcium carbonate, titanium dioxide, mica, quartz and combinations thereof;
   0.5% to 15% by weight of a stripping agent different from the pigment, the stripping agent being a mixture of oxide particles having a D90 of less than 50 microns, the mixture comprising $Al_2O_3$, $SiO_2$, $Fe_2O_3$, CaO, and MgO; and a solvent.

19. A hot stamping process for steel material, comprising:
   a) applying a curable protective coating composition comprising a film forming binder, a pigment, a stripping agent, and a solvent onto a surface of a steel material,
   b) curing the curable protective coating composition to obtain a coated steel material having a protective coating on the surface of the steel material,
   c) hot stamping the coated steel material,
   d) cooling the coated steel material to allow the protective coating to self-collapse, and
   e) removing the collapsed coating from the surface of the steel material.

20. The hot stamping process for steel material according to claim 19, wherein the protective coating has a dry film thickness of 2 to 20 μm.

21. The hot stamping process for steel material according to claim 19, wherein the curable protective coating composition is cured at a temperature 100° C. to 300° C.

22. The hot stamping process for steel material according to claim 19, wherein the film forming binder is selected from the group consisting of organosilicon polymer, organotitanium polymer, silicate, silane monomer, silane oligomer, silica, titanium oxide sol and combinations thereof.

23. A hot stamping process for steel material, comprising:
   a) applying a curable protective coating composition comprising a film forming binder, a pigment, a stripping agent different from the pigment, and a solvent onto a surface of a steel material,
   b) curing the curable protective coating composition to obtain a coated steel material having a protective coating on the surface of the steel material,
   c) hot stamping the coated steel material, and
   d) cooling the coated steel material to allow the protective coating to self-collapse.

\* \* \* \* \*